US008695708B2

(12) United States Patent
Fedorov et al.

(10) Patent No.: US 8,695,708 B2
(45) Date of Patent: Apr. 15, 2014

(54) METHOD FOR TREATING SUBTERRANEAN FORMATION WITH DEGRADABLE MATERIAL

(75) Inventors: Andrey Fedorov, Tyumen (RU); Olesya Levanyuk, Tyumen (RU); Tatiana Zolnikova, Tyumen (RU); Vadim Khlestkin, Novosibirsk (RU); Alexander Nadeev, Novosibirsk (RU); Diankui Fu, Novosibirsk (RU); Bruno Lecerf, Novosibirsk (RU); Shiyi Wang, Cambridge (GB); Gary John Tustin, Cambridge (GB); Valerie Lafitte, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 315 days.

(21) Appl. No.: 12/873,435

(22) Filed: Sep. 1, 2010

(65) Prior Publication Data

US 2011/0030958 A1 Feb. 10, 2011

Related U.S. Application Data

(63) Continuation-in-part of application No. 11/691,099, filed on Mar. 26, 2007, now abandoned.

(30) Foreign Application Priority Data

Sep. 16, 2009 (WO) ................ PCT/RU2009/000477

(51) Int. Cl.
*E21B 43/26* (2006.01)
*E21B 43/27* (2006.01)

(52) U.S. Cl.
USPC ....................... 166/305.1; 166/300

(58) Field of Classification Search
None
See application file for complete search history.

(56) References Cited

U.S. PATENT DOCUMENTS

| | | | |
|---|---|---|---|
| 3,353,600 A | 11/1967 | Annis et al. | |
| 4,715,967 A | 12/1987 | Bellis et al. | |
| 4,848,467 A | 7/1989 | Cantu et al. | |
| 4,957,165 A | 9/1990 | Cantu et al. | |
| 4,986,355 A | 1/1991 | Casad et al. | |
| 5,330,005 A | 7/1994 | Card et al. | |
| 5,439,055 A | 8/1995 | Card et al. | |
| 5,501,275 A | 3/1996 | Card et al. | |
| 5,551,516 A * | 9/1996 | Norman et al. | 166/308.2 |
| 5,782,300 A | 7/1998 | James et al. | |
| 5,939,453 A | 8/1999 | Heller et al. | |
| 5,964,295 A * | 10/1999 | Brown et al. | 166/308.2 |
| 5,979,555 A | 11/1999 | Gadberry et al. | |
| 5,979,557 A * | 11/1999 | Card et al. | 166/300 |
| 6,035,936 A * | 3/2000 | Whalen | 166/308.3 |
| 6,140,277 A * | 10/2000 | Tibbles et al. | 507/201 |
| 6,258,859 B1 * | 7/2001 | Dahayanake et al. | 516/77 |
| 6,435,277 B1 | 8/2002 | Qu et al. | |
| 6,509,301 B1 * | 1/2003 | Vollmer | 507/236 |
| 6,703,352 B2 | 3/2004 | Dahayanake et al. | |
| 6,713,807 B2 | 3/2004 | Weimer et al. | |
| 6,828,280 B2 | 12/2004 | England et al. | |
| 6,837,309 B2 | 1/2005 | Boney et al. | |
| 6,881,709 B2 | 4/2005 | Nelson et al. | |
| 6,908,888 B2 | 6/2005 | Lee et al. | |
| 6,938,693 B2 | 9/2005 | Boney et al. | |
| 7,036,585 B2 | 5/2006 | Zhou et al. | |
| 7,066,260 B2 | 6/2006 | Sullivan et al. | |
| 7,081,439 B2 | 7/2006 | Sullivan et al. | |
| 7,084,095 B2 | 8/2006 | Lee et al. | |
| 7,166,560 B2 | 1/2007 | Still et al. | |
| 7,219,731 B2 * | 5/2007 | Sullivan et al. | 166/278 |
| 7,265,079 B2 | 9/2007 | Willberg et al. | |
| 7,275,596 B2 | 10/2007 | Willberg et al. | |
| 7,380,600 B2 | 6/2008 | Willberg et al. | |
| 7,410,934 B2 | 8/2008 | Hughes et al. | |
| 7,691,789 B2 | 4/2010 | Fu et al. | |
| 2003/0060374 A1 | 3/2003 | Cooke, Jr. | |
| 2004/0216876 A1 | 11/2004 | Lee | |
| 2004/0221989 A1 | 11/2004 | Zhou et al. | |
| 2005/0034865 A1 | 2/2005 | Todd et al. | |
| 2005/0059558 A1 | 3/2005 | Blauch et al. | |
| 2005/0161220 A1 | 7/2005 | Todd et al. | |
| 2006/0276345 A1 | 12/2006 | Todd et al. | |
| 2007/0238622 A1 | 10/2007 | Fu et al. | |
| 2008/0070813 A1 * | 3/2008 | Lin et al. | 507/269 |

FOREIGN PATENT DOCUMENTS

| | | |
|---|---|---|
| WO | 02064945 | 8/2002 |
| WO | 03023177 | 3/2003 |
| WO | 2004037946 | 5/2004 |
| WO | 2004038176 | 5/2004 |
| WO | 2005028587 | 3/2005 |

* cited by examiner

*Primary Examiner* — Angela M DiTrani
(74) *Attorney, Agent, or Firm* — Jeremy D. Tillman; Rachel Greene; Tim Curington

(57) ABSTRACT

A method for treating a subterranean formation penetrated by a wellbore is provided. The method includes providing a treatment fluid containing a viscoelastic surfactant having at least one degradable linkage, a hydrolysable material, and a pH control material, and injecting the treatment fluid into a subterranean formation. The pH control material may have a pH equal or greater than about 9 and may include a strongly alkaline material and an oxidizing agent.

32 Claims, 8 Drawing Sheets

METHOD FOR TREATING SUBTERRANEAN FORMATION WITH DEGRADABLE MATERIAL

CROSS-REFERENCE TO RELATED APPLICATIONS

This application is a continuation-in-part application of application Ser. No. 11/691,099 filed on Mar. 26, 2007 and published as US2008/0236832 on Oct. 2, 2008, the disclosures of which are incorporated herein by reference in their entirety; this application also claims priority under 35 U.S.C. §365(a) to P.C.T. Application Number PCT/RU2009/000477 entitled Method For Treating Subterranean Formation With Degradable Material At Low Temperature filed on Sep. 16, 2009.

FIELD OF THE INVENTION

The present invention relates to the art of treating subterranean formations and more particularly, to a method of delivering a fluid treatment composition with base mixture and a degradable material into a formation for low temperature application. The invention is particularly applicable to methods of delivering low viscosity viscoelastic surfactant compositions that are capable of transporting large size proppants but break cleanly without the need for pre flushes or post flushes.

BACKGROUND

Hydraulic fracturing of subterranean formations has long been established as an effective means to stimulate the production of hydrocarbon fluids from a wellbore. In hydraulic fracturing, a well stimulation fluid (generally referred to as a fracturing fluid) is injected into and through a wellbore and against the surface of a subterranean formation penetrated by the wellbore at a pressure at least sufficient to create a fracture in the formation. Usually a "pad fluid" is injected first to create the fracture and then a fracturing fluid, often bearing granular propping agents, is injected at a pressure and rate sufficient to extend the fracture from the wellbore deeper into the formation. If a proppant is employed, the goal is generally to create a proppant filled zone from the tip of the fracture back to the wellbore. In any event, the hydraulically induced fracture is more permeable than the formation and it acts as a pathway or conduit for the hydrocarbon fluids in the formation to flow to the wellbore and then to the surface where they are collected.

The fluids used as fracturing fluids have also been varied, but many if not most are aqueous based fluids that have been "viscosified" or thickened by the addition of a natural or synthetic polymer (crosslinked or uncrosslinked) or a viscoelastic surfactant (VES). The carrier fluid is usually water or a brine (e.g., dilute aqueous solutions of sodium chloride and/or potassium chloride).

The viscosifying polymer is typically a solvatable (or hydratable) polysaccharide, such as a galactomannan gum, a glycomannan gum, or a cellulose derivative. Examples of such polymers include guar, hydroxypropyl guar, carboxymethyl guar, carboxymethylhydroxyethyl guar, hydroxyethyl cellulose, carboxymethylhydroxyethyl cellulose, hydroxypropyl cellulose, xanthan, polyacrylamides and other synthetic polymers. Of these, guar, hydroxypropyl guar and carboxymethylhydroxypropyl guar are typically preferred because of commercial availability and cost performance.

In many instances, if not most, the viscosifying polymer is crosslinked with a suitable crosslinking agent. The crosslinked polymer has an even higher viscosity and is even more effective at carrying proppant into the fractured formation. The borate ion has been used extensively as a crosslinking agent, typically in high pH fluids, for guar, guar derivatives and other galactomannans. Other crosslinking agents include, for example, titanium, chromium, iron, aluminum, and zirconium.

Viscoelastic surfactant fluids are normally made by mixing into the carrier fluid appropriate amounts of suitable surfactants such as anionic, cationic, nonionic and zwitterionic surfactants. The viscosity of viscoelastic surfactant fluids is attributed to the three dimensional structure formed by the components in the fluids. When the concentration of viscoelastic surfactants significantly exceeds a critical concentration, surfactant molecules aggregate into micelles, which can become highly entangled to form a network exhibiting elastic behavior.

Viscoelastic surfactant solutions are usually formed by the addition of certain reagents to concentrated solutions of surfactants, frequently consisting of long-chain quaternary ammonium salts such as cetyltrimethylammonium bromide (CTAB). Common reagents that generate viscoelasticity in the surfactant solutions are salts such as ammonium chloride, potassium chloride, sodium salicylate and sodium isocyanate and non-ionic organic molecules such as chloroform. The electrolyte content of surfactant solutions is also an important control on their viscoelastic behavior.

During hydraulic fracturing treatments, control of fracture height growth can be an important issue. In situations where the water table is close to the fracturing zone, or where the fracture zones have low stress barriers, where fracture height growth can result in screen outs, control of the fracture height may be critical. A common technique for the control of fracture height control is to use fluids with lower viscosity, such as VES surfactants. Lower viscosity fluids however, do not transport the large sized proppants effectively in the fracture.

One method of addressing the issue has been the incorporation of fiber into the surfactant fluids. However, the breaking of fiber and of fiber bearing VES fracturing fluid can be still be problematic especially without pre or post flushes. Polylactic acid (PLA) fibers have been shown to degrade into soluble materials under temperature and with time. However, all applications are limited to temperatures above 82° C. based on the rate of degradation. At temperatures below 82° C., PLA fibers degrade too slowly to be useful for those oilfield applications. It would be helpful to have a VES fluid which would transport the large sized proppants effectively and still break under low temperature conditions (below 82° C., for example 50° C. or 60° C.), leaving little or no residue solids in the fracture.

SUMMARY

In one embodiment, the invention provides a method for treating a subterranean formation penetrated by a wellbore which comprises providing a treatment fluid comprising a viscoelastic surfactant having at least one degradable linkage, a hydrolysable material, and a pH control material, wherein the pH control material has a pH equal or greater than about 9 and comprises a strongly alkaline material and an oxidizing agent; and injecting into the subterranean formation the treatment fluid.

In another embodiment, the invention provides a method for treating a subterranean formation penetrated by a wellbore which comprises injecting into the subterranean formation a treatment fluid made of a viscoelastic surfactant having at least one degradable linkage, a hydrolysable material and a pH control material, wherein the pH control material is an amine additive.

In some embodiments, the hydrolysable material is a hydrolysable fiber for example selected from the group consisting of polyesters, polyamides, and polylactides. The hydrolysable fiber and the viscoelastic surfactant may form non-solid products upon hydrolysis.

In some embodiments, the oxidizing agent and/or strongly alkaline material and/or the amine additive may be encapsulated.

In another embodiment, the strongly alkaline material has a pH of at least about 11. The strongly alkaline material may be selected from the group consisting of metal hydroxide, metal oxide, calcium hydroxide, metal carbonates, and metal bicarbonates. The metal hydroxide can be NaOH, $Ca(OH)_2$, $Mg(OH)_2$ or KOH and the metal oxide can be CaO, MgO or ZnO. The oxidizing agent may be persulfate ammonium or calcium peroxide. The amine additive may be selected from the group consisting of urea, dimethylolurea, 1,1-diethylurea, 1,1,3,3-tetramethylurea, 1,3-diethylurea, hydroxyurea, 1,3-diallylurea, ethylurea, 1,1-dimethylurea, 4-dimethylaminopyridine (DMAP) and 1,8-diazabicylo(5.4.0)undec-7-ene (DBU). The amine additive may further have a salt, for example potassium carbonate.

Unless otherwise specifically stated, all percentages herein are percentages by weight

DETAILED DESCRIPTION

Figure 1:
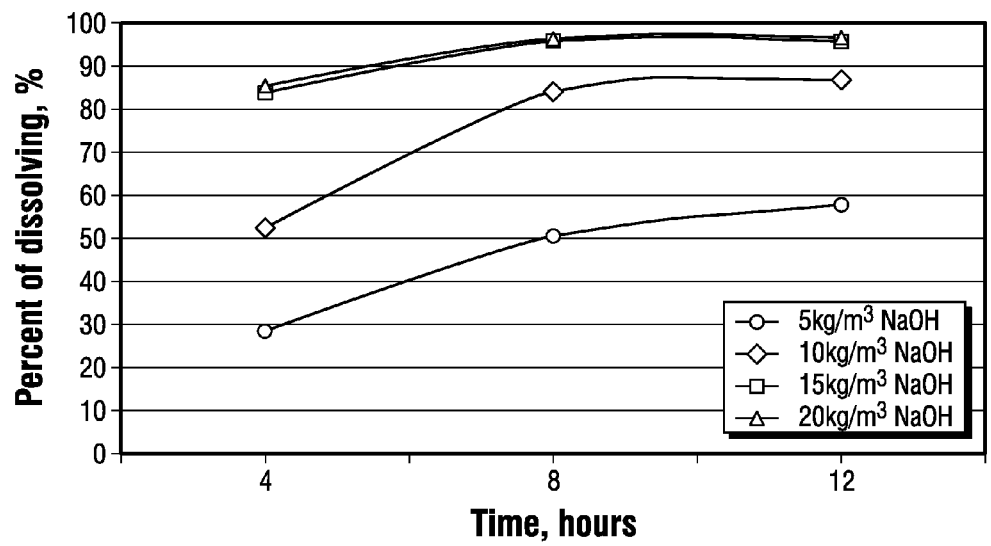
FIG. 1 is a graph plotting fiber dissolution over time in hours at 75° C.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors have disclosed and enabled the entire range and all points within the range.

A first embodiment is an oilfield treatment method including providing a fluid viscosified with a viscoelastic surfactant, including a degradable material and a base mixture for hydrolysis of PLA at low temperature.

According to some embodiments, degradable material is a degradable fiber or degradable particle. For example, degradable fibers or particles made of degradable polymers are used. The differing molecular structures of the degradable materials that are suitable for the present embodiments give a wide range of possibilities regarding regulating the degradation rate of the degradable material. The degradability of a polymer depends at least in part on its backbone structure. One of the more common structural characteristics is the presence of hydrolyzable and/or oxidizable linkages in the backbone. The rates of degradation of, for example, polyesters, are dependent on the type of repeat unit, composition, sequence, length, molecular geometry, molecular weight, morphology (e.g., crystallinity, size of spherulites, and orientation), hydrophilicity, surface area, and additives. Also, the environment to which the polymer is subjected may affect how the polymer degrades, e.g., temperature, presence of moisture, oxygen, microorganisms, enzymes, pH, and the like. One of ordinary skill in the art, with the benefit of this disclosure, will be able to determine what the optimum polymer would be for a given application considering the characteristics of the polymer utilized and the environment to which it will be subjected.

Suitable examples of polymers that may be used in accordance with the embodiments herewith include, but are not limited to, homopolymers, random aliphatic polyester copolymers, block aliphatic polyester copolymers, star aliphatic polyester copolymers, or hyperbranched aliphatic polyester copolymers. Such suitable polymers may be prepared by polycondensation reactions, ring-opening polymerizations, free radical polymerizations, anionic polymerizations, carbocationic polymerizations, coordinative ring-opening polymerization for, such as, lactones, and any other suitable process. Specific examples of suitable polymers include polysaccharides such as dextran or cellulose; chitins; chitosans; proteins; aliphatic polyesters; poly(lactides); poly(glycolides); poly(ε-caprolactones); poly(hydroxy ester ethers); poly(hydroxybutyrates); polyanhydrides; polycarbonates; poly(orthoesters); poly(acetals); poly(acrylates); poly(alkylacrylates); poly(amino acids); poly(ethylene oxide); poly ether esters; polyester amides; polyamides; polyphosphazenes; and copolymers or blends thereof. Other degradable polymers that are subject to hydrolytic degradation also may be suitable. Of these suitable polymers, aliphatic polyesters are preferred. Of the suitable aliphatic polyesters, polyesters of α or β hydroxy acids are preferred. Poly(lactide) is most preferred. Poly(lactide) is synthesized either from lactic acid by a condensation reaction or more commonly by ring-opening polymerization of cyclic lactide monomer. The lactide monomer exists generally in three different forms: two stereoisomers L- and D-lactide; and D,L-lactide (meso-lactide). The chirality of the lactide units provides a means to adjust, inter alia, degradation rates, as well as the physical and mechanical properties after the lactide is polymerized. Poly(L-lactide), for instance, is a semicrystalline polymer with a relatively slow hydrolysis rate. This could be desirable in applications where slow degradation of the degradable material is desired. Poly(D,L-lactide) is an amorphous polymer with a much faster hydrolysis rate. This may be suitable for other applications. The stereoisomers of lactic acid may be used individually or combined for use in the compositions and methods of the present embodiments. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other aliphatic polyesters. For example, the degradation rate of polylactic acid may be affected by blending, for example, high and low molecular weight polylactides; mixtures of polylactide and lactide monomer; or by blending polylactide with other aliphatic polyesters.

One guideline for choosing which composite particles to use in a particular application is what degradation products will result. Another guideline is the conditions surrounding a particular application. In choosing the appropriate degradable material, one should consider the degradation products that will result. For instance, some may form an acid upon degradation, and the presence of the acid may be undesirable; others may form degradation products that would be insoluble, and these may be undesirable. Moreover, these degradation products should not adversely affect other operations or components.

The physical properties of degradable polymers may depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, extensional viscosity with tension-stiffening behavior. The properties of the material utilized can be further tailored by blending, and copolymerizing it with another polymer, or by a change in the macromolecular architecture (e.g., hyper-branched polymers, star-shaped, or dendrimers, etc.). The properties of any such suitable degradable polymers (such as hydrophilicity, rate of biodegration, etc.) can be tailored by introducing functional groups along the polymer chains. One of ordinary skill in the art, with the benefit of this disclosure, will be able to determine the appropriate functional groups to introduce to the polymer chains to achieve the desired effect.

In one embodiment, the method employs degradable fiber when exposed to high pH conditions for a period of time. Examples of such fibers include, but are not limited to polyesters, polyamides, polylactides and the like.

In one embodiment, the method employs polylactic acid, which undergoes a hydrolysis to form a liquid when exposed to a high pH environment as shown in the following reaction scheme:

Scheme 1: Hydrolysis reaction of polylactic fibers

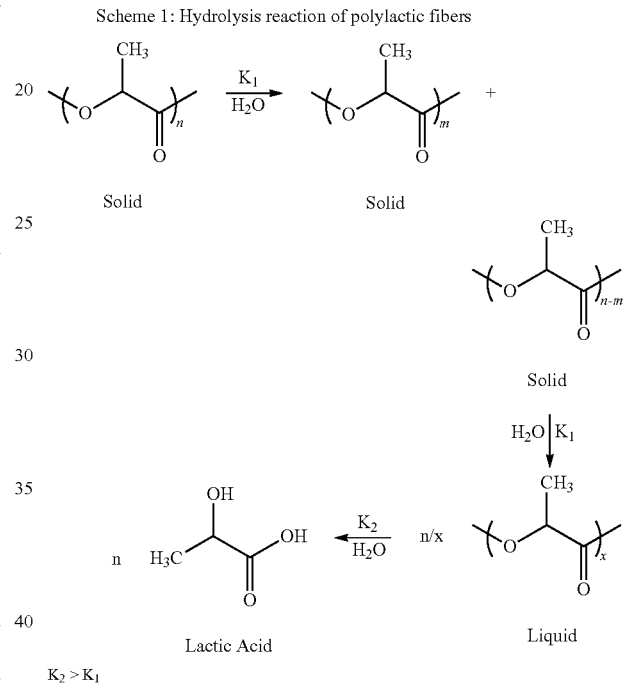

In order to provide a pH environment suitable for the hydrolysis of the fiber to occur at low temperature (as low as 40° C. and up to 85° C.), a base mixture is used. The base mixture can be a pH control agent.

Useful pH control agents will vary with the specific degradable fiber selected for use, but generally may include those agents which are strongly alkaline materials that may provide a high pH environment. Generally, pH control agents having a pH of 9 or more are considered to be strongly alkaline materials. Examples of such strongly alkaline materials include, but are not limited to, metal hydroxides, metal oxides, calcium hydroxide, metal carbonates or bicarbonates, and the like. For example, the strong alkaline material can be CaO, Ca(OH)$_2$, MgO as well as liquid additives such NaOH and KOH.

The pH control agent may also contain oxidizing agents such as (NH$_4$)$_2$S$_2$O$_4$ and CaO$_2$. The oxidizing agents were found to increase rate of fiber degradation when used in conjunction with metal oxide.

The pH control agent may also contain amines base additives such as urea and its derivatives, as well as nucleophilic amines such as 4-dimethylaminopyridine (DMAP) and 1,8-Diazabicyclo[5.4.0]undec-7-ene (DBU). In one embodiment, the pH control agent may also contain a combination of amines with potassium carbonate (K$_2$CO$_3$).

In a first embodiment, the pH control agent is made of a strongly alkaline material and an oxidizing agent. In a second embodiment, the pH control agent is made of an amine additive. The amine additive can be an amine base and/or a nucleophilic amine. In one embodiment, the amine additive may also be a amine and a salt. In a third embodiment, the pH control agent is made of a strongly alkaline material, an oxidizing agent and an amine additive.

The amount of pH control agent required to provide hydrolysis at low temperature will vary with the particular control agent selected and with the system, but generally, the pH control agent may comprise from about 0.5 weight percent to about 15 weight percent of the treatment fluid. In one embodiment, the fluid may contain from about 1 weight percent to about 10 weight percent. In another embodiment, the fluid may contain about 3 weight percent to about 10 weight percent. In yet another embodiment, the fluid may contain from about 3 weight percent to about 7 weight percent.

When fluids are viscosified by the addition of viscoelastic surfactant systems, the viscosity increase is believed to be due to the formation of micelles, for example worm-like micelles, which entangle to give structure to the fluid that leads to the viscosity. In addition to the viscosity itself, an important aspect of a fluid's properties is the degree of viscosity-recovery or re-healing when the fluid is subjected to high shear and the shear is then reduced. For VES fluids, shear may disrupt the micelle structure, after which the structure reforms. Controlling the degree of reassembling (re-healing) is necessary to maximize performance of the surfactant system for different applications. For example, in hydraulic fracturing it is critical for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to "jet" the solids more efficiently from the bottom of the wellbore into the annulus. Once in the annulus the regained viscosity ensures that the solids are effectively transported to the surface. Controlling the viscosity-recovery and the time required for such recovery is therefore desirable.

Many viscoelastic surfactants may be used in this application. Surfactants with a degradable linkage in the molecule will hydrolyse to separate the hydrophilic head and the hydrophobic tail. While not wishing to be bound by theory, it is believed that such separation will degrade the micelles formed by the VES surfactant.

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference.

In one embodiment, the viscoelastic surfactant has an amide linkage in the head group, according to the scheme

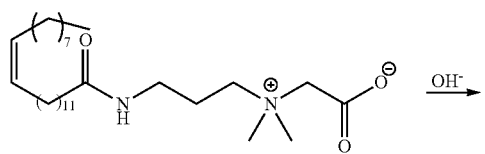 OH⁻→

-continued

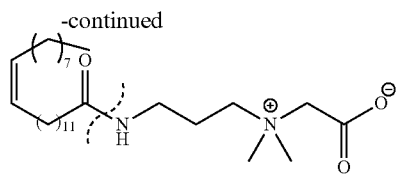

XX Examples of suitable cationic viscoelastic surfactants include cationic surfactants having the structure:

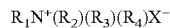

R$_1$N$^+$(R$_2$)(R$_3$)(R$_4$)X$^-$ in which R$_1$ has from about 14 to about 26 carbon atoms and may be branched or straight chained, aromatic, saturated or unsaturated, and may contain a carbonyl, an amide, a retroamide, an imide, or an amine; R$_2$, R$_3$, and R$_4$ are each independently hydrogen or a C$_1$ to about C$_6$ aliphatic group which may be the same or different, branched or straight chained, saturated or unsaturated and one or more than one of which may be substituted with a group that renders the R$_2$, R$_3$, and R$_4$ group more hydrophilic; the R$_2$, R$_3$ and R$_4$ groups may be incorporated into a heterocyclic 5- or 6-member ring structure which includes the nitrogen atom; the R$_2$, R$_3$ and R$_4$ groups may be the same or different; and X$^-$ is an anion. Mixtures of such compounds are also suitable. As a further example, R$_1$ is from about 18 to about 22 carbon atoms and may contain a carbonyl, an amide, or an amine, and R$_2$, R$_3$, and R$_4$ are the same as one another and contain from 1 to about 3 carbon atoms. Cationic surfactants having the structure R$_1$N$^+$(R$_2$)(R$_3$)(R$_4$)X$^-$ may optionally contain amines having the structure R$_1$N(R$_2$)(R$_3$). It is well known that commercially available cationic quaternary amine surfactants often contain the corresponding amines (in which R$_1$, R$_2$, and R$_3$ in the cationic surfactant and in the amine have the same structure). As received commercially available VES surfactant concentrate formulations, for example cationic VES surfactant formulations, may also optionally contain one or more members of the group consisting of solvents, mutual solvents, organic acids, organic acid salts, inorganic salts, and oligomers, polymers, co-polymers, and mixtures of these members. They may also contain performance enhancers, such as viscosity enhancers, for example polysulfonates, for example polysulfonic acids, as described in copending U.S. Patent Application Publication No. 2003-0134751 which has a common Assignee as the present application and which is hereby incorporated by reference.

Another suitable cationic VES is erucyl bis(2-hydroxyethyl) methyl ammonium chloride, ("EMHAC"), also known as (Z)-13 docosenyl-N—N-bis(2-hydroxyethyl) methyl ammonium chloride. It is commonly obtained from manufacturers as a mixture containing about 60 weight percent surfactant in a mixture of iso-propanol, ethylene glycol and water. In this patent, when we refer to "EMHAC" we mean such a solution. Other suitable amine salts and quaternary amine salts include (either alone or in combination), erucyl trimethyl ammonium chloride; N-methyl-N,N-bis(2-hydroxyethyl) rapeseed ammonium chloride; oleyl methyl bis (hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl)

ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

Zwitterionic viscoelastic surfactants are also suitable. Exemplary zwitterionic viscoelastic surfactants include those described in U.S. Pat. No. 6,703,352 which has a common Assignee as the present application and which is hereby incorporated by reference. Exemplary zwitterionic surfactants have the structure:

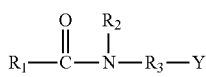

in which $R_1$ is a hydrocarbyl group that may be branched or straight chained, aromatic, aliphatic or olefinic and contains from about 14 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. More particularly, the zwitterionic surfactant may have the betaine structure:

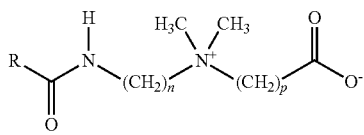

in which R is a hydrocarbyl group that may be branched or straight chained, aromatic, aliphatic or olefinic and has from about 14 to about 26 carbon atoms and may contain an amine; n=about 2 to about 4; and p=1 to about 5. Mixtures of these compounds may also be used.

Two examples of suitable betaines are, respectively, BET-O-30 and BET-E-40. The VES surfactant in BET-O-30 is oleylamidopropyl betaine. It is designated BET-O-30 here, because as obtained from the supplier (Rhodia, Inc. Cranbury, N.J., U.S.A.) it is called Mirataine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, was used in the experiments described below; one chemical name is erucylamidopropyl betaine. BET-E-40 is also available from Rhodia; it contains a erucic acid amide group (including a $C_{21}H_{41}$ alkene tail group) and is supplied as about 40% active ingredient, with the remainder substantially water, sodium chloride, and iso-propanol. BET surfactants, and others that are suitable, are described in U.S. Pat. No. 6,703,352.

Certain co-surfactants may be useful in extending the brine tolerance, to increase the gel strength, to reduce the shear rehealing time, and/or to reduce the shear sensitivity of zwitterionic VES fluid systems, such as betaine VES fluids. An example given in U.S. Pat. No. 6,703,352 is sodium dodecylbenzene sulfonate (SDBS). Another example is polynaphthalene sulfonate. Zwitterionic VES surfactants may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate. Many suitable additives are known for improving the performance of gelled VES surfactant systems; any may be used; they should be tested for compatibility with the compositions and methods of the present embodiments before use; simple laboratory experiments for such testing are well known.

Zwitterionic surfactant viscoelastic systems typically contain one or more members of the group consisting of organic acids, organic acid salts, inorganic salts, and oligomers, polymers, co-polymers, and mixtures of these members. This member is typically present in only a minor amount and need not be present at all. The organic acid is typically a sulfonic acid or a carboxylic acid and the anionic counter-ion of the organic acid salts are typically sulfonates or carboxylates. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred are salicylate, phthalate, p-toluene sulfonate, hydroxynaphthalene carboxylates, e.g. 5-hydroxy-1-naphthoic acid, 6-hydroxy-1-naphthoic acid, 7-hydroxy-1-naphthoic acid, 1-hydroxy-2-naphthoic acid, preferably 3-hydroxy-2-naphthoic acid, 5-hydroxy-2-naphthoic acid, 7-hydroxy-2-naphthoic acid, and 1,3-dihydroxy-2-naphthoic acid and 3,4-dichlorobenzoate. The organic acid or salt thereof typically aids the development of increased viscosity that is characteristic of preferred fluids. The organic acid or salt thereof is typically present in the zwitterionic viscoelastic fluid (after the viscoelastic surfactant has concentrated sufficiently to viscosify the fluid) at a weight concentration of from about 0.1% to about 10%, more typically from about 0.1% to about 7%, and even more typically from about 0.1% to about 6%.

Inorganic salts that are particularly suitable for use in the zwitterionic viscoelastic fluid include water-soluble potassium, sodium, and ammonium salts, such as potassium chloride and ammonium chloride. Additionally, calcium chloride, calcium bromide and zinc halide salts may also be used. The inorganic salts may aid in the development of increased viscosity which is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight. The inorganic salt is typically present in the zwitterionic viscoelastic fluid (after the viscoelastic surfactant has concentrated sufficiently to viscosify the fluid) at a weight concentration of from about 0.1% to about 30%, more typically from about 0.1% to about 10%, and even more typically from about 0.1% to about 8%. Organic salts, e.g. trimethylammonium hydrochloride and tetramethylammonium chloride, may also be used in addition to, or as a replacement for, the inorganic salts. Optionally, these systems may be formed in dense brines, including brines containing polyvalent cations.

As an alternative to the organic salts and inorganic salts, or as a partial substitute therefore, one can use a medium to long chain alcohol (preferably an alkanol), preferably having five to ten carbon atoms, or an alcohol ethoxylate (preferably an alkanol ethoxylate) preferably of a 12 to 16 carbon alcohol and having 1 to 6, preferably 1-4, oxyethylene units.

Amphoteric viscoelastic surfactants are also suitable. Exemplary amphoteric viscoelastic surfactants include those described in U.S. Pat. No. 6,703,352, for example amine oxides. One useful amine oxide surfactant has the formula:

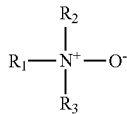

wherein $R_1$, $R_2$, and $R_3$ are independently selected from alkyl, alkenyl, arylalkyl, or hydroxyalkyl groups wherein each of said alkyl groups contain from about 8 to about 24 carbon atoms and may be branched or straight chained and saturated or unsaturated Mixtures of zwitterionic surfactants and amphoteric surfactants are also suitable. An example, called BET-E-40/AO here, is a mixture of about 13% iso-propanol, about 5% 1-butanol, about 15% ethylene glycol monobutyl ether, about 4% sodium chloride, about 30% water, about 30% cocamidopropyl betaine, and about 2% cocamidopropylamine oxide.

The fluid may be used, for example in oilfield treatments. As examples, the fluid may be used as a pad fluid and as a carrier fluid in hydraulic fracturing, as a carrier fluid for lost circulation control agents, and as a carrier fluid for gravel packing.

The optimal concentration of a given rheology enhancing additive for a given choice of VES surfactant fluid system at a given concentration and temperature, and with given other materials present, can be determined by simple experiments. The total viscoelastic surfactant concentration must be sufficient to form a viscoelastic gel under conditions at which the surfactants have sufficient aggregation tendency. The appropriate amounts of surfactant and rheology enhancer are those necessary to achieve the desired viscosity and shear recovery time as determined by experiment. In general, the amount of surfactant (as active ingredient) is from about 1 to about 10%. Commercially available surfactant concentrates may contain some materials that we have found may be used as rheology enhancers, for example for concentrate freezing point depression, but normally the amount of such material is not sufficient, when the concentrate is diluted, in the final fluid. The amount of rheology enhancer used, in addition to any that may be already present in the as-received surfactant concentrate, is from about 0.1 to about 6%, for example from about 0.25 to about 3.5%, most particularly from about 0.25 to about 1.75%. Mixtures of surfactants and/or mixtures of rheology enhancers may be used.

EXAMPLES

The present embodiments can be further understood from the following examples:

FIG. 1 shows the results of PLA fiber (3.6 kg/m$^3$) degradation in polymer solution with different amount of NaOH added, at temperature of 75° C. Table 1 shows the results of fiber degradation in fluids at 60° C. prepared with 3.6 kg/m$^3$ PLA fiber and different amounts of CaO and Ca(OH)$_2$. As can be seen, higher concentration of CaO and Ca(OH)$_2$ resulted in faster degradation of PLA fibers.

TABLE 1

| Chemical | Concentration, g/L | Degradation time, days |
|---|---|---|
| CaO | 1 | >10 days |
| CaO | 3 | 7 |

TABLE 1-continued

| Chemical | Concentration, g/L | Degradation time, days |
|---|---|---|
| CaO | 5 | 2 |
| Ca(OH)$_2$ | 1 | >10 days |
| Ca(OH)$_2$ | 3 | 7 |
| Ca(OH)$_2$ | 5 | 2 |

Figure 2:
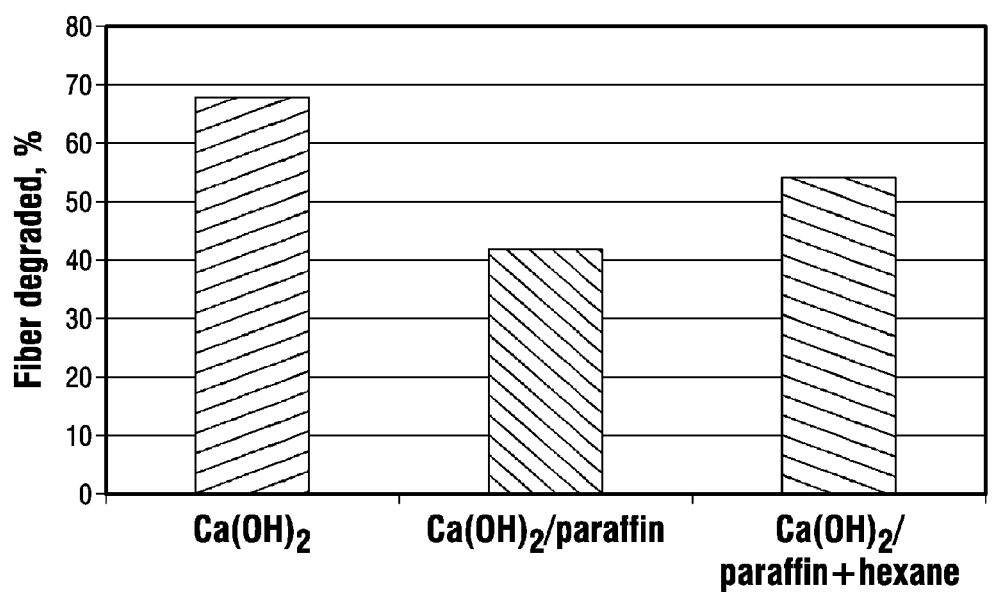
FIG. 2 is a graph plotting PLA fiber degradation after 18 h 30 min at 50° C.

Additives such as CaO or Ca(OH)$_2$ can either be made large mesh size or encapsulated to avoid fast dissolution in fracturing fluids during pumping and flowback (dissolution constant for Ca(OH)$_2$ is $6\times10^{-6}$ mol$^3$/L$^3$). FIG. 2 demonstrates PLA fiber degradation at low temperature (bottles heated from room temperature to 50° C.) in the presence of Ca(OH)$_2$ (fine powder and encapsulated in paraffin (hydroxide:paraffin ratio is 1:1)). Also, degradation in the presence of encapsulated Ca(OH)$_2$ with hexane (oil mimic) is shown.

Figure 3:
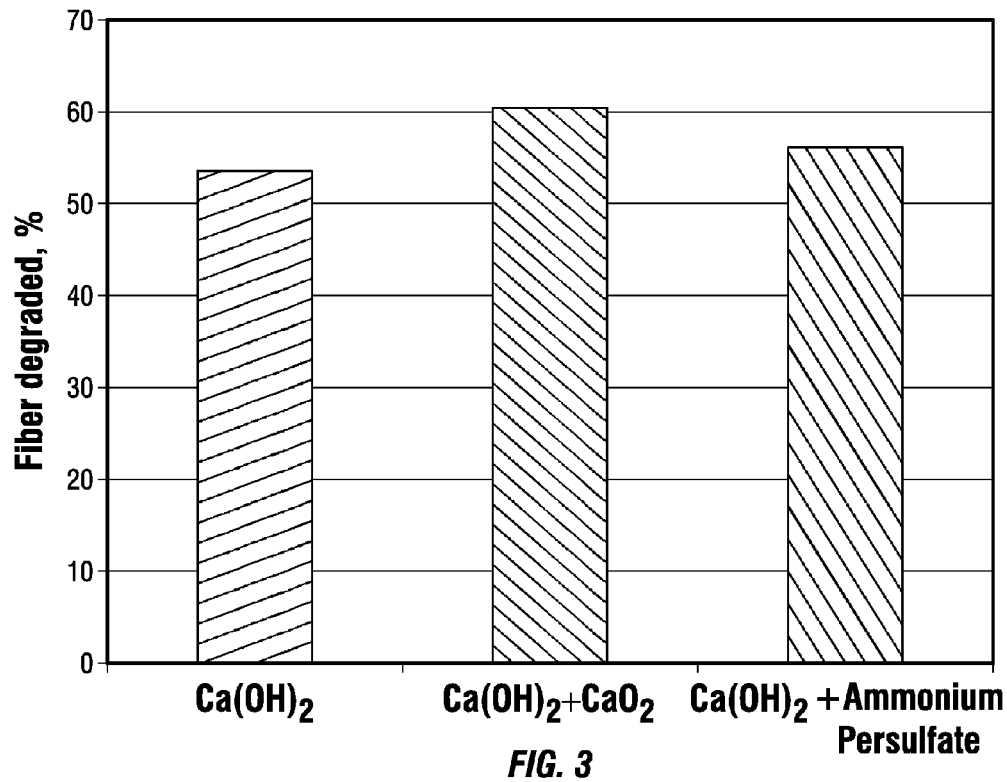
FIG. 3 is a graph plotting PLA fiber degradation after 4 h at 50° C.

The use of pre-heated sample at 50° C., Ca(OH)$_2$ slurry showed even higher degradation rates (FIG. 3). Also, positive influences of peroxide type oxidizers on the degradation rate were also observed.

Figure 4:
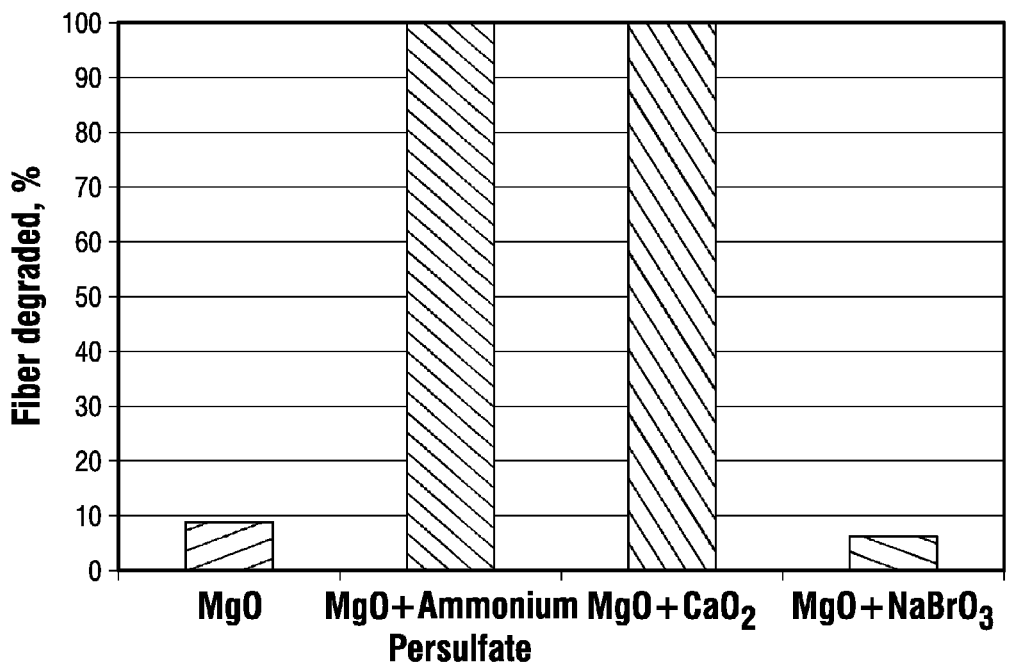
FIG. 4 is a graph plotting PLA fiber degradation with different oxidizing agents at 50° C.
Figure 5:
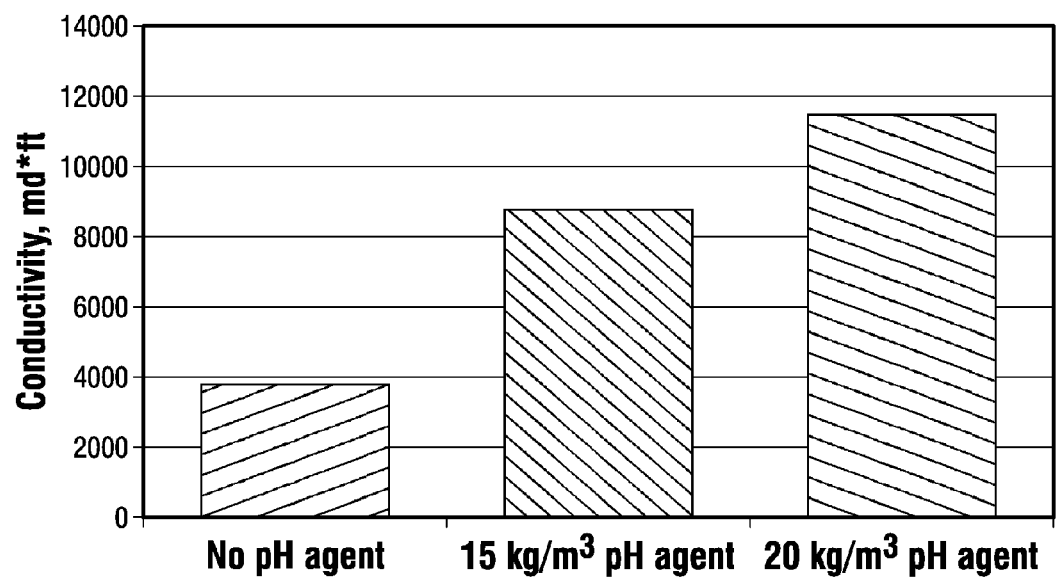
FIG. 5 is a graph plotting conductivity of Fores 12/18 proppants with fiber and different amount of sodium hydroxide.

FIG. 4 shows that MgO did not have significant impact on PLA degradation at 50° C. However, when mixed with oxidizing agents such as ammonium persulfate and calcium peroxide, MgO significantly increases the rate of degradation of PLA. Interestingly, addition of the non-generating oxidizer sodium bromate to MgO did not have any impact on PLA degradation at the same temperature. It is expected that the amount of fiber degraded will have a significant impact on the fracture conductivity as shown in FIG. 5.

Figure 6:
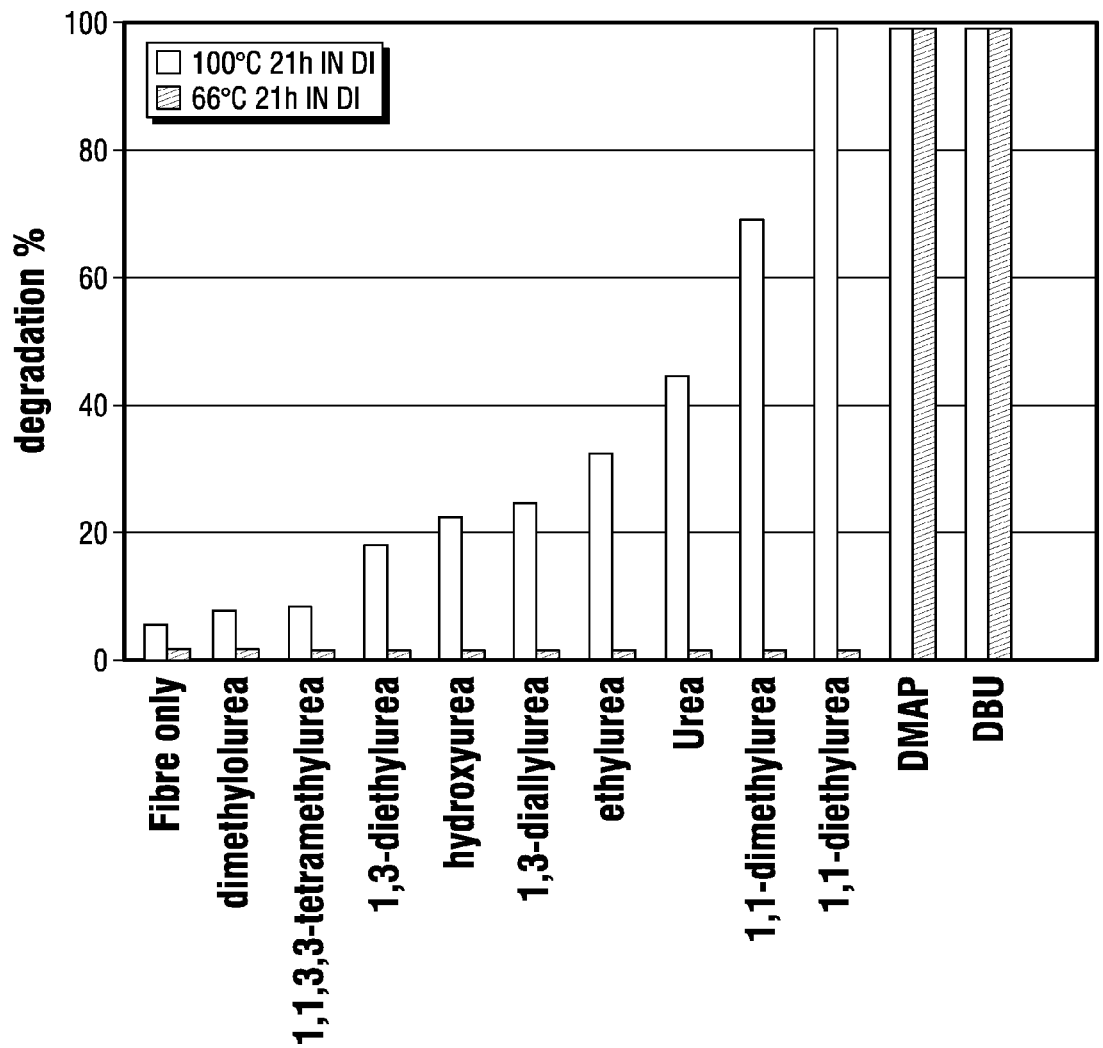
FIG. 6 is a graph plotting degradation of fibers with various urea additives and amine additives at 66° C. and 100° C.

A series of amines derivatives were also evaluated in order to increase the degradation rate of the polymer. Nucleophilic bases were chosen and in particular amines bases. Amongst them, urea and its derivatives were assessed. Indeed, urea and its derivatives self-decompose and liberate ammonia which reacts rapidly with ester bonds, leading to amide terminated oligomers. The nucleophilic attack of the amine together with a high pH environment accelerates the degradation rate of the fibers as shown in FIG. 6. In all of the experiments a loading of fibers of 1 kg/m$^3$ of fluid was used.

Figure 7:
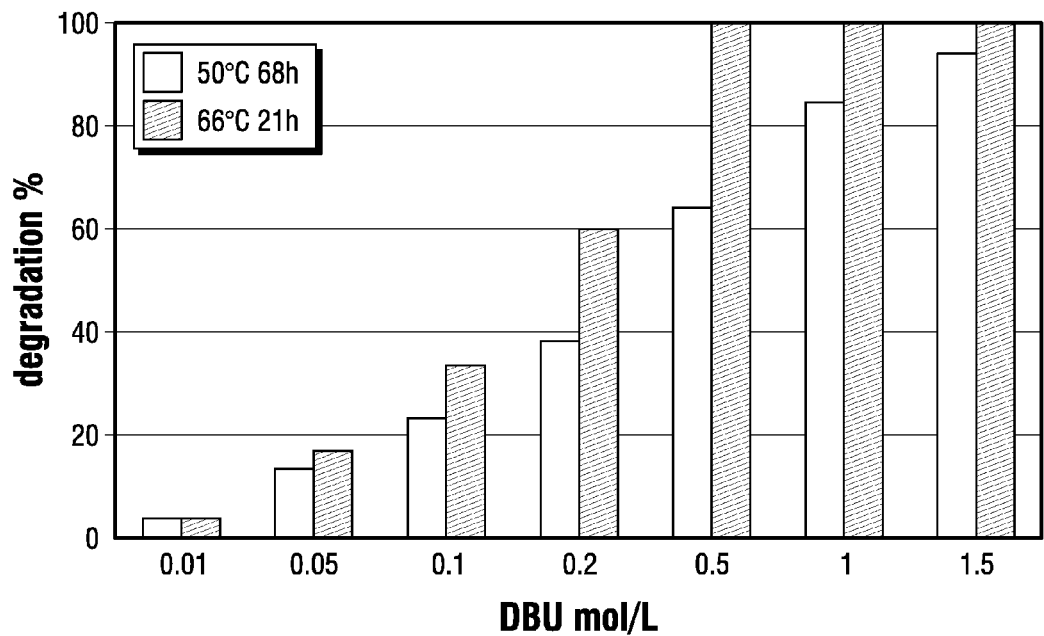
FIG. 7 is a graph plotting degradation of fibers as a function of DBU concentration at 50° C. and 66° C.

Some derivatives such as 4-dimethylaminopyridine (DMAP) and 1,8-Diazabicyclo[5.4.0]undec-7-ene (DBU) accelerate significantly the degradation rate at 66° C. Further experiments were then carried out to further study the action of DMAP and DBU on the degradation of fibers at low temperatures. FIG. 7, shows the influence of DBU (with various concentrations) on the degradation of the fibers at 50° C. and 66° C. It appears that a concentration of 0.5 mol/L gives full degradation at 66° C. after 21 h. Much higher concentrations are required to achieve full degradation at 50° C.

Figure 8:
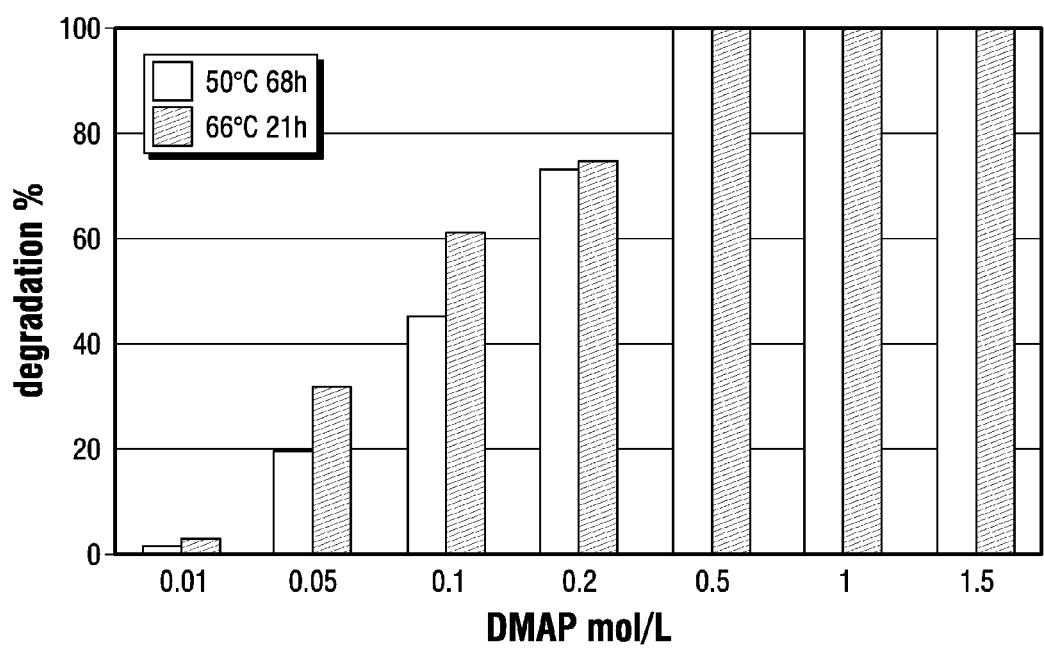
FIG. 8 is a graph plotting degradation of fibers with DMAP as a function of DBU concentration at 50° C. and 66° C.

The results obtained with the addition of DMAP are presented in FIG. 8. As compared to DBU, DMAP accelerates more significantly the degradation at low temperatures. A concentration of 0.2 mol/L to 0.5 mol/L of DMAP gives significant degradation of the fibers. The combination of these derivatives with the presence of a base such as K$_2$CO$_3$ was also investigated and results are shown on FIGS. 9 and 10.

Figure 9:
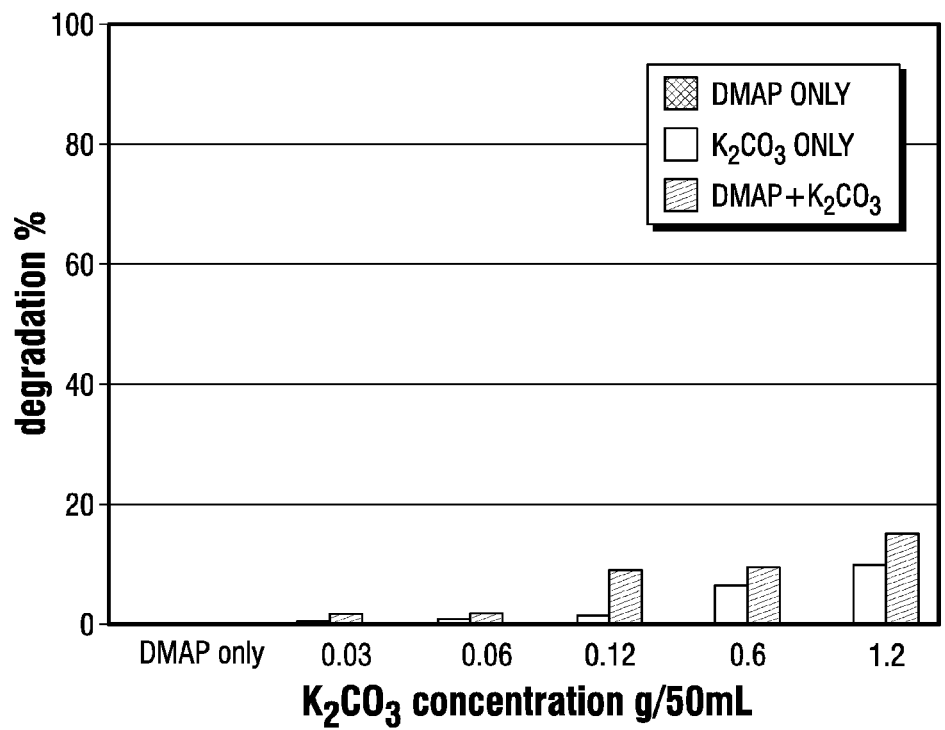
FIG. 9 is a graph plotting degradation of fibers with DMAP at 50° C. for 58 hours.
Figure 10:
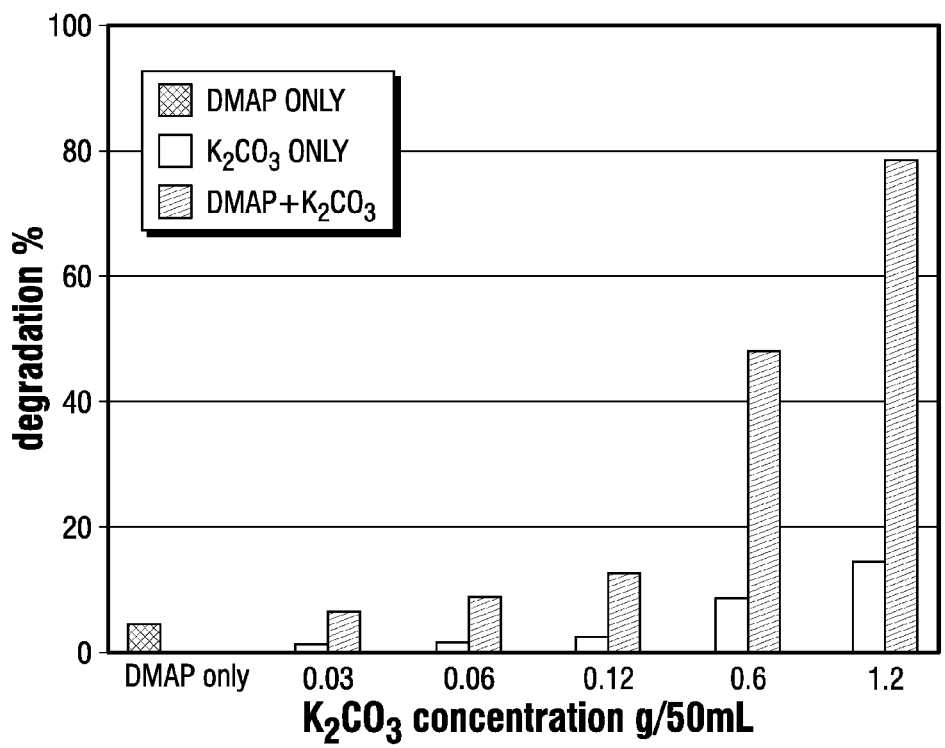
FIG. 10 is a graph plotting degradation of fibers with DMAP at 66° C. for 21 hours.
Figure 11:
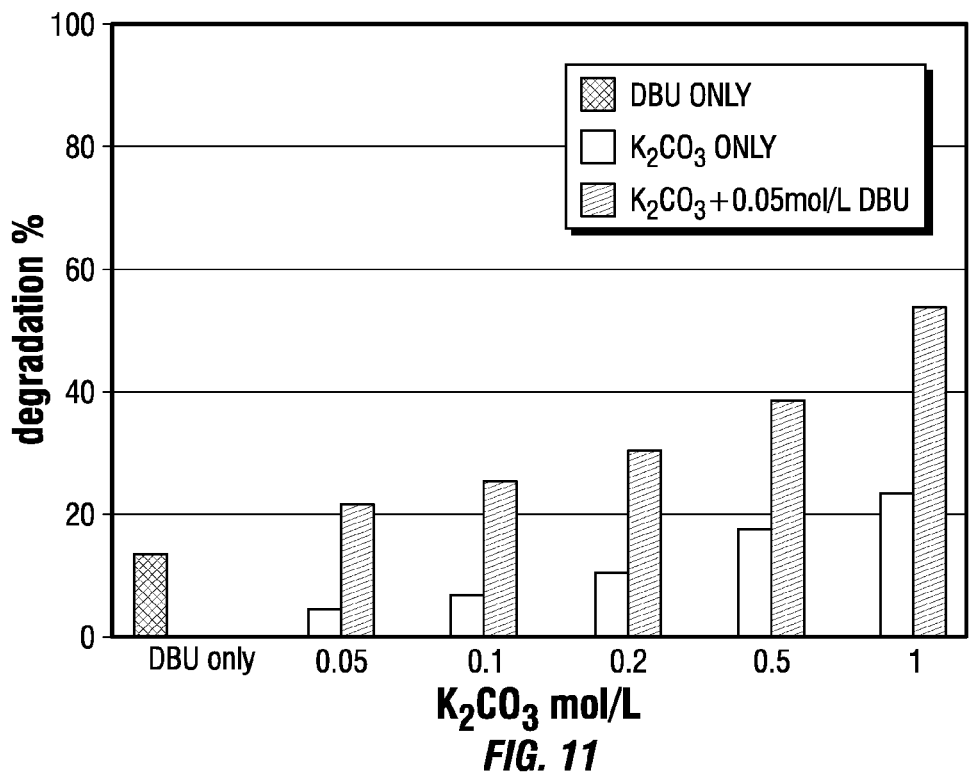
FIG. 11 is a graph plotting degradation of fibers with DBU at 50° C. for 68 hours.
Figure 12:
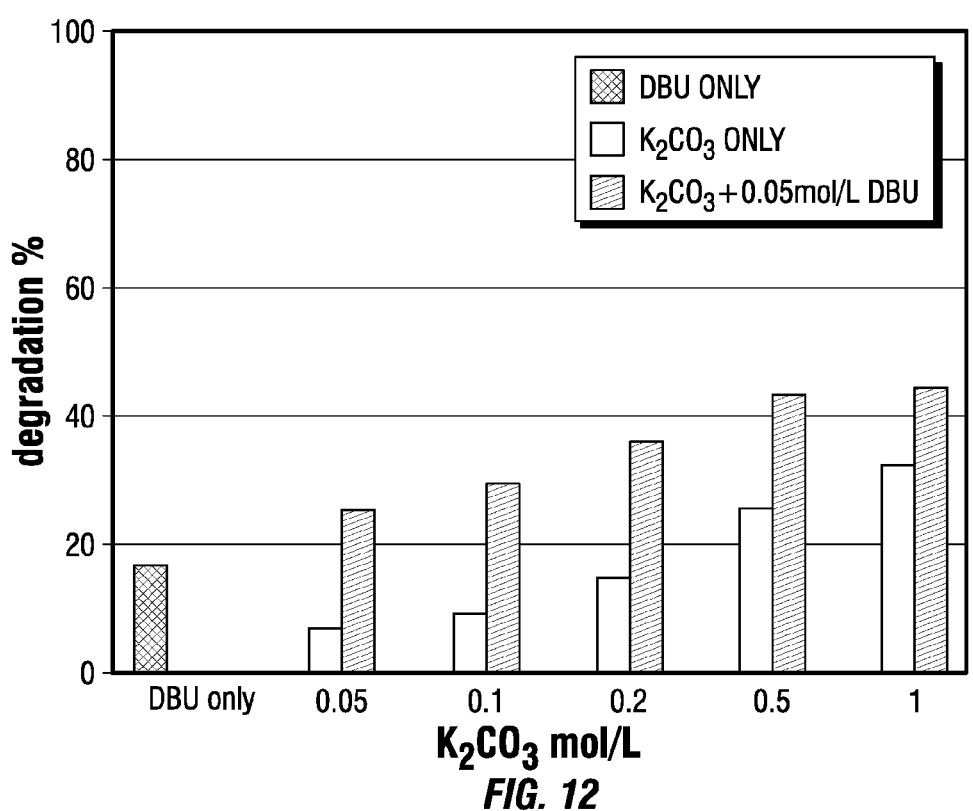
FIG. 12 is a graph plotting degradation of fibers with DBU at 66° C. for 21 hours.
Figure 13:
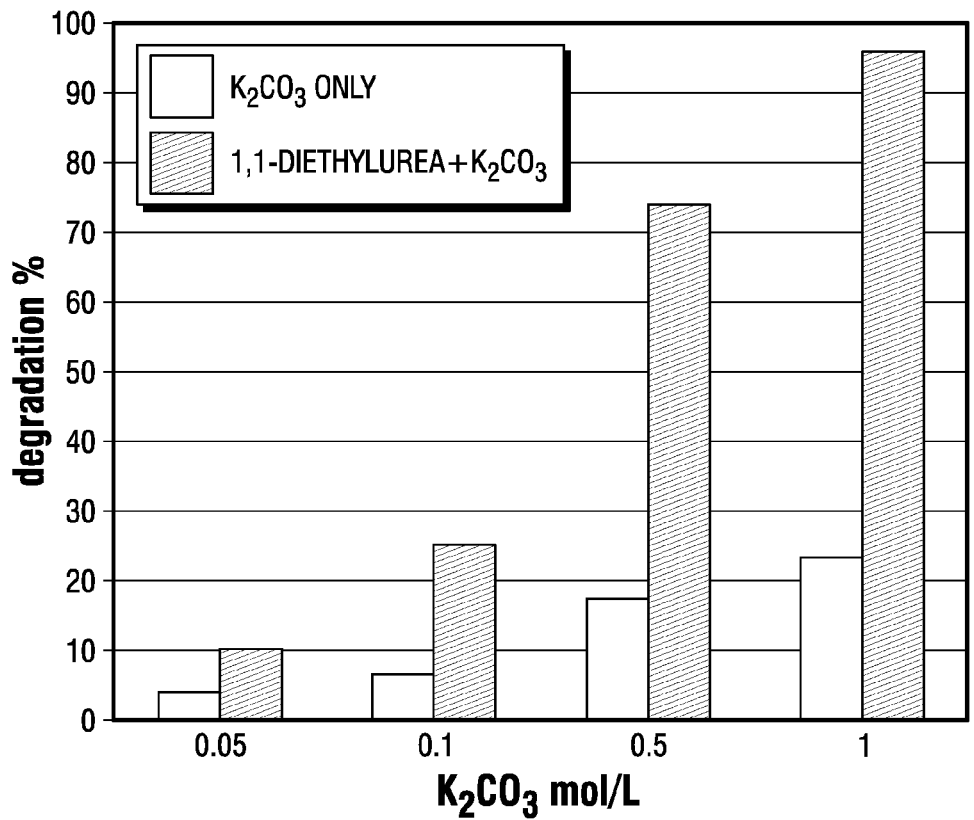
FIG. 13 is a graph plotting degradation of fibers with 1,1-diethylurea at 50° C. for 5 hours.
Figure 14:
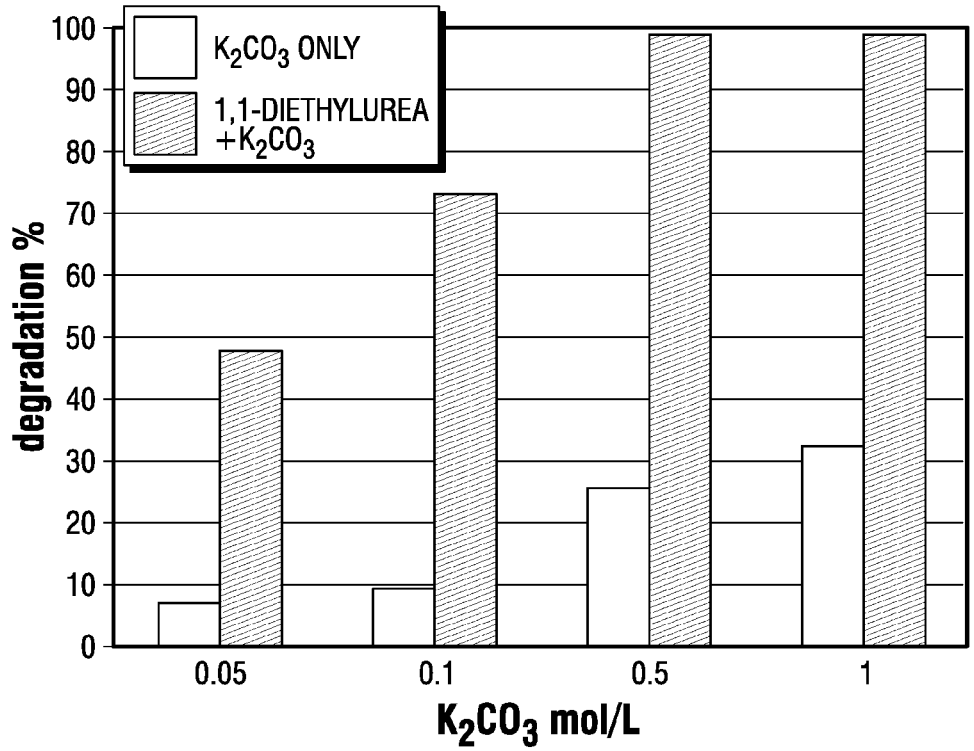
FIG. 14 is a graph plotting degradation of fibers with 1,1-diethylurea at 66° C. for 21 hours.

FIGS. 9 and 10 show the influence of the presence of various amounts of K$_2$CO$_3$ together with DMAP (at 0.01M). The experiments were performed at 66° C. for 21 h and 50° C. for 68 h. Results show that there is an increase of degradation of the fibers when using the combination of the two products. K$_2$CO$_3$ is a base which helps maintaining a high pH environment. As the degradation of the polymer occurs, lactic acid is generated which decreases the overall pH of the solution. In acidic environment protonation of the amine can occurs which will then limit its activity on the degradation process. Therefore keeping the pH alkaline is a much better option to insure faster degradation.

Similar results were obtained with DBU and 1,1-diethyl urea as shown in FIGS. 11, 12, 13 and 14.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method for treating a subterranean formation penetrated by a wellbore comprising: providing a treatment fluid comprising a viscoelastic surfactant having at least one degradable linkage, a hydrolysable material, and a pH control material, wherein the pH control material comprises a metal oxide and an oxidizing agent selected from the group consisting of ammonium persulfate and calcium peroxide; and injecting into the subterranean formation the treatment fluid, wherein the metal oxide and the oxidizing agent act to break the hydrolysable material after a period of time.

2. The method of claim 1, wherein the hydrolysable material is a hydrolysable fiber.

3. The method of claim 2, wherein the hydrolysable fiber and the viscoelastic surfactant form non-solid products upon hydrolysis.

4. The method of claim 2, wherein the fiber is selected from the group consisting of polyesters, polyamides, and polylactides.

5. The method of claim 1, wherein the oxidizing agent is encapsulated and/or the metal oxide is encapsulated.

6. The method of claim 1, wherein the pH control material has a pH of at least about 11.

7. The method of claim 1, wherein the metal oxide is CaO, MgO or ZnO.

8. The method of claim 1, wherein the pH control material comprises at least two metal oxides.

9. The method of claim 1, wherein the pH control material further comprises an amine additive.

10. The method of claim 9, wherein the amine additive is selected from the group consisting of urea, dimethylolurea, 1,1-diethylurea, 1,1,3,3-tetramethylurea, 1,3-diethylurea, hydroxyurea, 1,3-diallylurea, ethylurea, 1,1-dimethylurea, 4-dimethylaminopyridine (DMAP) and 1,8-diazabicylo(5.4.0)undec-7-ene (DBU).

11. The method of claim 9, wherein the amine additive further comprises a salt.

12. The method of claim 11, wherein the salt is potassium carbonate.

13. The method of claim 1, wherein the viscoelastic surfactant contains an amide linkage.

14. The method of claim 13, wherein the viscoelastic surfactant is represented by a formula:

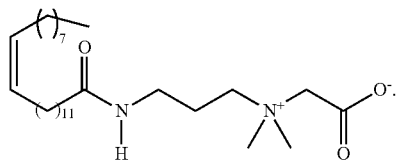

15. The method of claim 1, wherein the fluid further comprises a proppant.

16. The method of claim 1, wherein the fluid further comprises an additive selected from the group consisting of corrosion inhibitors, fluid-loss additives, and mixtures thereof.

17. The method of claim 1, wherein the fluid further comprises a gas component to provide a foam or energized fluid wherein said gas component comprises a gas selected from the group consisting of nitrogen, air, and carbon dioxide.

18. A method for treating a subterranean formation penetrated by a wellbore which comprises injecting into the subterranean formation a treatment fluid comprising a viscoelastic surfactant having at least one degradable linkage, a hydrolysable material, and a pH control material, wherein the pH control material comprises an amine additive selected from the group consisting of urea, dimethylolurea, 1,1-diethylurea, 1,1,3,3-tetramethylurea, 1,3-diethylurea, hydroxyurea, 1,3-diallylurea, and ethylurea, 1,1-dimethylurea, a metal oxide and an oxidizing agent selected from the group consisting of ammonium persulfate and calcium peroxide, wherein the metal oxide and the oxidizing agent act to break the hydrolysable material after a period of time.

19. The method of claim 18, wherein the hydrolysable material is a hydrolysable fiber.

20. The method of claim 19, wherein the hydrolysable fiber and the viscoelastic surfactant form non-solid products upon hydrolysis.

21. The method of claim 19, wherein the fiber is selected from the group consisting of polyesters, polyamides, and polylactides.

22. The method of claim 18, wherein the amine additive is encapsulated.

23. The method of claim 18, wherein the amine additive further comprises a salt.

24. The method of claim 23, wherein the salt is potassium carbonate.

25. The method of claim 18, wherein the oxidizing agent is encapsulated and/or the metal oxide is encapsulated.

26. The method of claim 18, wherein the metal oxide has a pH of at least about 11.

27. The method of claim 18, wherein the metal oxide is CaO, MgO or ZnO.

28. The method of claim 18 wherein the viscoelastic surfactant contains an amide linkage.

29. The method of claim 27 wherein the viscoelastic surfactant is represented by a formula:

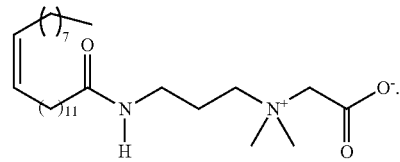

30. The method of claim 18 wherein the fluid further comprises a proppant.

31. The method of claim 18 wherein the fluid further comprises an additive selected from the group consisting of corrosion inhibitors, fluid-loss additives, and mixtures thereof.

32. The method of claim 18 wherein the fluid further comprises a gas component to provide a foam or energized fluid wherein said gas component comprises a gas selected from the group consisting of nitrogen, air, and carbon dioxide.

* * * * *